(12) United States Patent
Juris et al.

(10) Patent No.: US 10,661,705 B2
(45) Date of Patent: *May 26, 2020

(54) EXTERIOR REARVIEW MIRROR WITH TURN SIGNAL UNIT

(71) Applicant: Magna Mirrors Holding GmbH, Sailauf (DE)

(72) Inventors: Peter Juris, Váhom (SK); Mark Kennedy, Aschaffenburg (DE)

(73) Assignee: MAGNA MIRRORS HOLDING GMBH, Sailauf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,116

(22) Filed: Jan. 4, 2019

(65) Prior Publication Data
US 2019/0135168 A1 May 9, 2019

Related U.S. Application Data

(63) Continuation of application No. 15/642,750, filed on Jul. 6, 2017, now Pat. No. 10,173,581.

(30) Foreign Application Priority Data

Jul. 8, 2016 (DE) .......................... 10 2016 212 527

(51) Int. Cl.
*F21V 5/00* (2018.01)
*B60Q 1/26* (2006.01)
(Continued)

(52) U.S. Cl.
CPC ............. *B60Q 1/2665* (2013.01); *B60Q 1/28* (2013.01); *B60Q 1/34* (2013.01); *B60R 1/06* (2013.01);
(Continued)

(58) Field of Classification Search
CPC ...... B60Q 1/2665; B60Q 1/2696; B60Q 1/34; B60Q 1/0076; B60Q 1/0088;
(Continued)

(56) References Cited

U.S. PATENT DOCUMENTS 4,041,301 A  8/1977 Pelchat
4,788,630 A  11/1988 Gavagan
(Continued)

FOREIGN PATENT DOCUMENTS

DE   10043101   3/2002
DE   10212794   6/2003
(Continued)

OTHER PUBLICATIONS

German Search Report dated Feb. 20, 2017 from corresponding German Patent Application No. DE 102016212527.3.

*Primary Examiner* — Thien M Le
(74) *Attorney, Agent, or Firm* — Honigman LLP

(57) ABSTRACT

An exterior rearview mirror assembly for a vehicle includes a turn signal unit having a housing, a light source and a lens disposed in front of the light source and attached at the housing. The turn signal unit includes an aperture element disposed between the light source and the lens, and includes a film disposed between the lens and the housing so as to be in front of the light source. With the exterior rearview mirror assembly disposed at a side of the vehicle, light emitted by the light source, when powered, passes through the film and through an aperture of the aperture element and through the lens in the forward direction of travel of the equipped vehicle. The film includes structured sections such that light emitted by the light source, when powered, passes through the structured sections of the film and forms an illuminated logo.

20 Claims, 2 Drawing Sheets

(51) Int. Cl.
  *F21S 43/20* (2018.01)
  *F21S 43/27* (2018.01)
  *B60R 1/06* (2006.01)
  *F21S 43/237* (2018.01)
  *F21S 43/245* (2018.01)
  *F21S 43/247* (2018.01)
  *B60Q 1/28* (2006.01)
  *B60Q 1/34* (2006.01)
  *B60R 1/12* (2006.01)
  *F21V 17/16* (2006.01)
  *F21W 103/20* (2018.01)
  *B60R 13/00* (2006.01)

(52) U.S. Cl.
  CPC .......... *B60R 1/1207* (2013.01); *F21S 43/237* (2018.01); *F21S 43/245* (2018.01); *F21S 43/247* (2018.01); *F21S 43/255* (2018.01); *F21S 43/26* (2018.01); *F21S 43/27* (2018.01); *F21V 17/162* (2013.01); *B60R 13/005* (2013.01); *F21W 2103/20* (2018.01)

(58) Field of Classification Search
  CPC ........ B60Q 1/2607; B60Q 1/50; B60Q 1/525; B60Q 9/00; B60Q 9/008; B60Q 1/0023; B60Q 1/0094; B60Q 1/28; B60Q 1/38; F21V 23/005; F21V 23/0464; F21V 17/162; F21V 7/09
  See application file for complete search history.

(56) References Cited

U.S. PATENT DOCUMENTS

| | | |
|---|---|---|
| 4,972,173 A | 11/1990 | Raciti |
| 5,040,103 A | 8/1991 | Lions |
| 5,233,375 A | 8/1993 | Williams et al. |
| 5,297,010 A | 3/1994 | Camarota et al. |
| 5,371,659 A | 12/1994 | Pastrick et al. |
| 5,497,305 A | 3/1996 | Pastrick et al. |
| 5,497,306 A | 3/1996 | Pastrick |
| 5,499,169 A | 3/1996 | Chen |
| 5,581,230 A | 12/1996 | Barrett |
| 5,587,699 A | 12/1996 | Faloon |
| 5,669,699 A | 9/1997 | Pastrick et al. |
| 5,815,018 A | 9/1998 | Soborski |
| 5,910,993 A | 6/1999 | Aoki |
| 6,002,341 A | 12/1999 | Ohta et al. |
| 6,049,271 A | 4/2000 | Chu |
| 6,062,613 A | 5/2000 | Jung et al. |
| 6,070,998 A | 6/2000 | Jennings et al. |
| 6,149,287 A | 11/2000 | Pastrick et al. |
| 6,152,590 A | 11/2000 | Furst et al. |
| 6,158,869 A | 12/2000 | Barnes, Jr. |
| 6,273,579 B1 | 8/2001 | Holloway |
| 6,299,333 B1 | 10/2001 | Pastrick et al. |
| 6,304,168 B1 | 10/2001 | Ohta et al. |
| 6,315,419 B1 | 11/2001 | Platzer, Jr. |
| 6,315,437 B1 * | 11/2001 | Katz .................. B60Q 1/2665 340/475 |
| 6,347,880 B1 | 2/2002 | Furst et al. |
| 6,416,208 B2 | 7/2002 | Pastrick et al. |
| 6,416,209 B1 | 7/2002 | Abbott |
| 6,523,888 B1 | 2/2003 | Yan et al. |
| 6,561,667 B2 | 5/2003 | Stapf |
| 6,561,685 B2 | 5/2003 | Weber et al. |
| 6,616,313 B2 | 9/2003 | Furst et al. |
| 6,623,124 B2 | 9/2003 | Okura |
| 6,690,268 B2 | 2/2004 | Schofield et al. |
| 6,710,471 B1 | 3/2004 | Schmitz |
| 6,779,372 B2 | 8/2004 | Arlt et al. |
| 6,793,385 B2 | 9/2004 | Tiesler et al. |
| 6,809,630 B1 | 10/2004 | Dreimann et al. |
| 6,812,823 B2 | 11/2004 | Inaba et al. |
| 6,847,289 B2 | 1/2005 | Pang et al. |
| 6,848,816 B2 | 2/2005 | Gilbert et al. |
| 6,924,735 B2 | 8/2005 | Ueda et al. |
| 6,926,431 B1 | 8/2005 | Foote et al. |
| 6,926,432 B2 | 8/2005 | Rodriguez Barros et al. |
| 6,981,789 B2 | 1/2006 | Assinder et al. |
| 7,005,959 B2 | 2/2006 | Amagasa et al. |
| 7,049,940 B2 | 5/2006 | Ieda et al. |
| 7,055,997 B2 | 6/2006 | Baek |
| 7,065,439 B2 | 6/2006 | Sakakura |
| 7,091,836 B2 | 8/2006 | Kachouch et al. |
| 7,097,312 B2 | 8/2006 | Platzer, Jr. |
| 7,104,675 B2 | 9/2006 | Chen |
| 7,121,688 B2 | 10/2006 | Rempel |
| 7,126,456 B2 | 10/2006 | Boddy et al. |
| 7,175,321 B1 | 2/2007 | Lopez |
| 7,175,324 B2 | 2/2007 | Kwon |
| 7,210,798 B2 | 5/2007 | Belliveau |
| 7,244,054 B2 | 7/2007 | Chou |
| 7,255,451 B2 | 8/2007 | McCabe et al. |
| 7,261,446 B2 | 8/2007 | Thomas |
| 7,270,452 B2 | 9/2007 | Wang |
| 7,274,501 B2 | 9/2007 | McCabe et al. |
| 7,289,037 B2 | 10/2007 | Uken et al. |
| 7,301,466 B2 * | 11/2007 | Asai .................. B60R 1/00 250/330 |
| 7,333,021 B2 | 2/2008 | Ieda et al. |
| 7,334,923 B2 | 2/2008 | Tanaka et al. |
| 7,350,949 B2 | 4/2008 | Meinke |
| 7,438,453 B2 | 10/2008 | Saitoh et al. |
| 7,607,809 B2 | 10/2009 | Misawa |
| 7,626,749 B2 | 12/2009 | Baur et al. |
| 7,635,210 B2 | 12/2009 | Metros et al. |
| 7,708,438 B2 | 5/2010 | Yajima et al. |
| 7,878,693 B2 | 2/2011 | Liesner |
| 7,944,371 B2 | 5/2011 | Foote et al. |
| 7,988,305 B2 | 8/2011 | Itoh et al. |
| 8,102,279 B2 * | 1/2012 | Foote .................. B60Q 1/2665 340/903 |
| 8,274,226 B1 | 9/2012 | Sikora et al. |
| 8,287,164 B2 | 10/2012 | Fehn et al. |
| 8,333,492 B2 | 12/2012 | Dingman et al. |
| 8,764,256 B2 | 7/2014 | Foote et al. |
| 10,173,581 B2 | 1/2019 | Juris et al. |
| 2002/0105432 A1 | 8/2002 | Pederson et al. |
| 2003/0174499 A1 | 9/2003 | Bohlander |
| 2004/0233677 A1 | 11/2004 | Su et al. |
| 2005/0036329 A1 | 2/2005 | Henschel et al. |
| 2005/0105299 A1 | 5/2005 | Gilbert et al. |
| 2005/0117364 A1 | 6/2005 | Rennick et al. |
| 2006/0061008 A1 * | 3/2006 | Karner ............... B29C 45/0017 264/250 |
| 2006/0226953 A1 | 10/2006 | Shelley et al. |
| 2007/0097698 A1 | 5/2007 | Song et al. |
| 2007/0182527 A1 | 8/2007 | Traylor et al. |
| 2007/0203618 A1 | 8/2007 | McBride et al. |
| 2007/0206383 A1 | 9/2007 | Broude et al. |
| 2007/0279923 A1 | 12/2007 | Rodriguez Barros et al. |
| 2008/0018127 A1 | 1/2008 | Schindler et al. |
| 2008/0061933 A1 | 3/2008 | Ieda et al. |
| 2008/0106389 A1 | 5/2008 | Desai |
| 2008/0278793 A1 | 11/2008 | Tonar |
| 2009/0040306 A1 | 2/2009 | Foote et al. |
| 2009/0073709 A1 | 3/2009 | Yajima et al. |
| 2009/0115631 A1 | 5/2009 | Foote et al. |
| 2009/0161379 A1 | 6/2009 | Liesener |
| 2009/0257240 A1 | 10/2009 | Koike |
| 2010/0321945 A1 | 12/2010 | Lang et al. |
| 2011/0085255 A1 | 4/2011 | Koo |
| 2012/0081915 A1 | 4/2012 | Foote et al. |
| 2012/0099173 A1 | 4/2012 | Gentry |
| 2013/0130674 A1 | 5/2013 | De Wind et al. |
| 2013/0188260 A1 | 7/2013 | Matsushita |
| 2013/0242586 A1 | 9/2013 | Huizen et al. |
| 2015/0167917 A1 | 6/2015 | Takahashi |
| 2016/0236742 A1 * | 8/2016 | Chen .................... B60Q 1/2665 |
| 2017/0373687 A1 | 12/2017 | Neugart |
| 2018/0009383 A1 * | 1/2018 | Lynam ................ B60Q 1/2665 |
| 2018/0010760 A1 * | 1/2018 | Juris .................. F21S 43/255 |
| 2018/0056871 A1 * | 3/2018 | Karner .................... B60R 1/06 |

(56) References Cited

U.S. PATENT DOCUMENTS

FOREIGN PATENT DOCUMENTS

| | | |
|---|---|---|
| DE | 102006035842 | 3/2007 |
| DE | 102011103200 | 12/2012 |
| DE | 102014106081 | 11/2014 |
| EP | 1284335 | 2/2003 |
| EP | 1304260 | 4/2003 |
| EP | 1690736 | 8/2006 |
| EP | 1738959 | 1/2007 |
| GB | 2341365 | 3/2000 |
| GB | 2342212 | 4/2000 |
| JP | 2010254056 | 11/2010 |
| WO | WO2005035308 | 4/2003 |
| WO | WO2008051910 | 5/2008 |
| WO | WO2011028686 | 3/2011 |

\* cited by examiner

EXTERIOR REARVIEW MIRROR WITH TURN SIGNAL UNIT

CROSS REFERENCE TO RELATED APPLICATIONS

The present application is a continuation of U.S. patent application Ser. No. 15/642,750, filed Jul. 6, 2017, now U.S. Pat. No. 10,173,581, which is based on a priority patent application DE 10 2016 212 527.3, filed Jul. 8, 2016, which is hereby incorporated herein by reference in its entirety.

FIELD OF THE INVENTION

The present invention relates generally to the field of exterior rearview mirror assemblies for vehicles and, more particularly, exterior rearview mirror assemblies that include a turn signal unit.

BACKGROUND OF THE INVENTION

External mirrors that comprise a turn signal unit are well known. They are increasingly popular additional turn signal devices in motor vehicles and on the one hand increase the safety of the vehicle and on the other hand enhance the vehicle aesthetically.

Various embodiments of external mirrors with integrated turn signals are known, for example from US 2007/0279923 A1.

A light window for an illuminated unit in an external mirror arrangement is known from DE 10 2011 103 200 A1, wherein the light window is matched to the external contour of the housing of the external mirror arrangement and the light window closes an opening in the housing of the external mirror arrangement, and wherein the light window acts as a light conductor and comprises output coupling structures at one point at least of the light window, wherein the light window is made of an optical film with a sprayed-on coating that is implemented as a light conductor, and wherein the optical film contains at least one output coupling structure. Features such as captions can be integrated within the film. The film is completely integrated within a plastic material forming the coating and a protective layer.

SUMMARY OF THE INVENTION

The present invention concerns a turn signal unit for an external mirror for a motor vehicle, wherein the turn signal unit is arranged to radiate a flashing light forwards in the direction of travel with the turn signal unit and the external mirror in the installation position and concerns an external mirror comprising such a turn signal unit.

It is an object of the invention to provide a turn signal unit for an external mirror for a motor vehicle, wherein the optical design of the turn signal unit can be altered simply and inexpensively for various types of vehicles or various vehicles.

The object is achieved by a turn signal unit for an external mirror for a motor vehicle, wherein the turn signal unit is designed to radiate flashing light forwards in the direction of travel in the installation position, wherein the turn signal unit comprises a light source and a lens disposed in front of the light source, and wherein a film with alternating light transmissive and non-light transmissive structures is clamped in the space between the light source and the lens.

In this case, "in front of" according to the invention means in the illumination direction and thereby also forwards in the direction of travel of the motor vehicle—accordingly "behind" refers to the reverse direction, i.e., opposite to the illumination direction of the turn signal.

According to the invention, a film is disposed between the light source and the lens, which preferably forms the outer boundary of the turn signal unit, and is fixed by clamping. The film carries alternating light transmissive and non-light transmissive structures, i.e., structured sections, so that it structures the emanating light during flashing and can form patterns, styles, captions, logos and similar for example.

The film is clamped and preferably not fixed in other ways in the turn signal unit; in particular it is not glued or sprayed, so that the film can easily be replaced.

This enables the optical design of the turn signal unit to be changed very simply and inexpensively for different types of vehicle or vehicles during the manufacture thereof, or even thereafter depending on the implementation by replacing the film.

The alternating light transmissive and non-light transmissive structures of the film preferably form a pattern, in particular a visually appealing design, a caption and/or a logo.

The turn signal unit preferably comprises an aperture or element between the light source and the lens. The film can then preferably be clamped by the aperture or element and the lens, i.e., be clamped between the aperture element and the lens. The aperture element and the lens can have approximately the same size.

The turn signal unit preferably comprises a housing floor behind the light source. The film can be clamped by the housing floor and the lens. The housing floor can likewise be of a similar size to the lens and can preferably be slightly larger than the lens and can hold the lens and/or accommodate the lens as a frame.

If the turn signal unit comprises a housing floor behind the light source and an aperture or element between the light source and the lens, the film can be clamped by the housing floor and the aperture element. A clamping effect can also be achieved by the housing floor, aperture and lens together.

The housing floor and/or the aperture element and/or the lens preferably comprises at least one shape that is designed to clamp the film in a non-slip manner, in particular a flange that can be oriented parallel to the film, or a spring element or a groove element. As a result, the film can in particular be clamped between two flange surfaces and/or between groove and spring elements.

The light source of the turn signal unit can preferably be formed by a light conductor and/or by LEDs.

The lens can also be permanently fixed after attaching the film, in particular it can be welded to the housing.

A plurality of films can also be used in a turn signal unit according to the invention, preferably with all films being clamped.

An external mirror according to the invention for a motor vehicle comprises a turn signal unit as described above. In the case of an installed external mirror, the turn signal unit is disposed in the external mirror such that the flashing light is essentially radiated forwards in the direction of travel, and in doing so passes through the clamped film with light transmissive and non-light transmissive structures. The film acts as a mask for the flashing light in order to combine the forward-radiating light field of the turn signal with optical structures, such as patterns, captions or logos. The optical structures are preferably only visible, or only markedly visible, if the turn signal is active.

BRIEF DESCRIPTION OF THE DRAWINGS

The invention is described below by way of example with reference to the figures.

DESCRIPTION OF THE PREFERRED EMBODIMENTS

Figure 1:
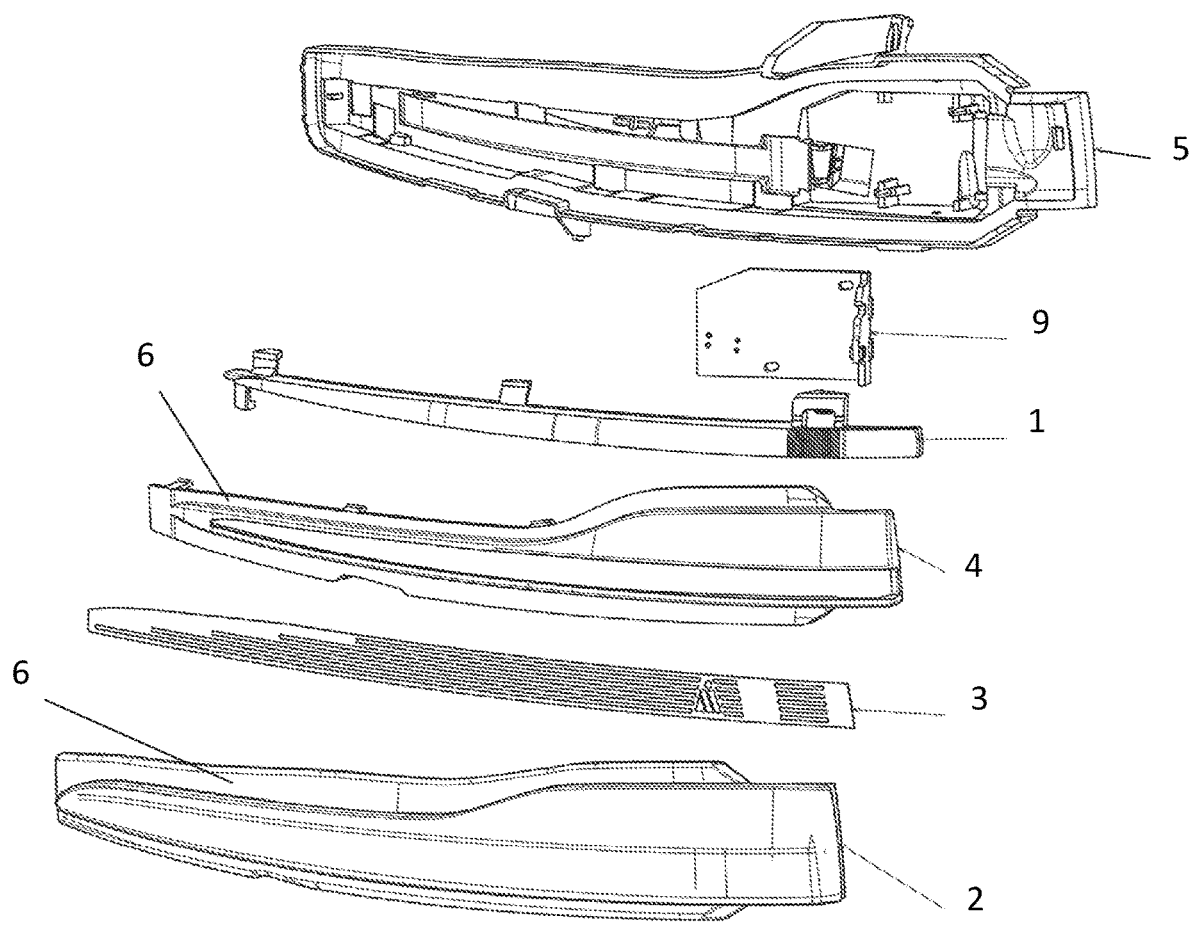
FIG. 1 is an exploded representation of a turn signal unit according to the invention for an external mirror.

In FIG. 1, a turn signal unit according to the invention for an external mirror for a motor vehicle is shown in an exploded representation. The turn signal unit comprises—looking in the direction of travel of the vehicle and in the illumination direction of the turn signal unit, which is at the upper edge of the image in FIG. 1—the following components from the rear forwards: a housing floor 5 that acts as a support for the turn signal unit, a control unit 9, which can be implemented as a PCBA (Printed Circuit Board Assembly) and that can form an electrical input or optical input for a light source, a light source 1, which is implemented as a light conductor, an aperture or element 4 that comprises in the centre thereof an opening for the passage of light and comprises a non-light transmissive frame, a film 3 with alternating light transmissive and non-light transmissive structures, i.e. a pattern that acts as a mask for the passage of light, and an at least partly light transmissive lens 2 forming the boundary and front housing component of the turn signal unit.

In the embodiment of FIG. 1, the film 3 is clamped between the flange surfaces 6 of the aperture or element 4 on the one hand and the lens 2 on the other hand and can thus in particular be simply removed from the turn signal unit following removal of the lens 2 and replaced.

Figure 2:
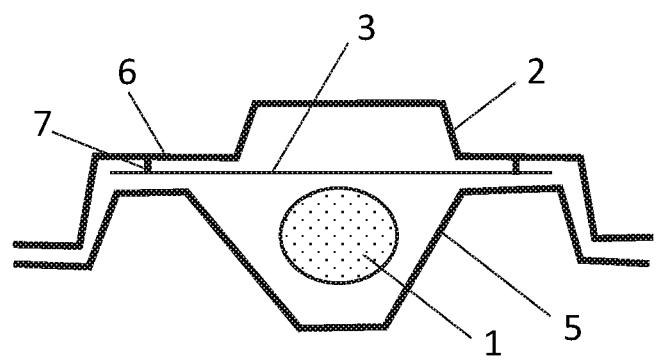
FIG. 2 is a sectional view of a turn signal unit according to the invention in a further embodiment.
Figure 3:
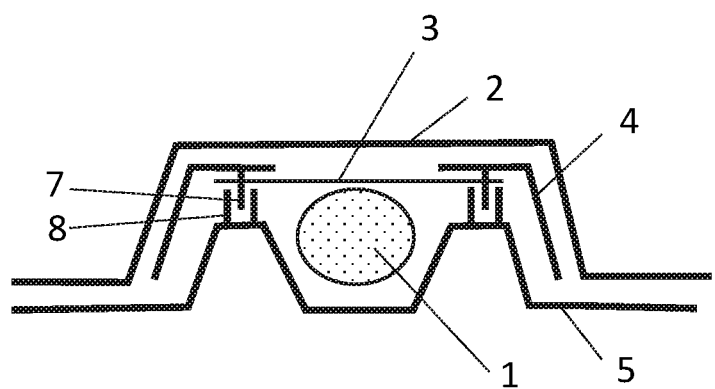
FIG. 3 is a sectional view of a turn signal unit according to the invention in a further embodiment.

FIG. 2 and FIG. 3 show further possibilities for the arrangement and clamping of the film 3 in a turn signal unit in sectional representations.

Here in FIG. 2 the film 3 is directly clamped between the lens 2 and the housing floor 5. In addition to mutually parallel flange surfaces 6, in said embodiment spring elements 7 are formed on the lens 2 to clamp the film 3.

The version of a turn signal unit represented in FIG. 3 comprises an aperture or element 4. The film 3 is clamped here by means of groove and spring elements 8, 7 of the aperture or element 4 and housing floor 5.

Of course, the film 3 can also be clamped by a plurality of elements, in particular by the interaction of the lens 2, aperture or element 4 and housing floor 5.

REFERENCE CHARACTER LIST 1 light source
2 lens
3 film
4 aperture or element
5 housing floor
6 flange
7 spring element
8 groove element
9 control unit

The invention claimed is:

1. An exterior rearview mirror assembly for a vehicle, wherein the exterior rearview mirror assembly is configured to be disposed at a side of a vehicle, the exterior rearview mirror assembly comprising:

a turn signal unit comprising a housing, a light source and a lens, wherein the lens is disposed in front of the light source, and wherein the lens is attached at the housing;

wherein the light source comprises at least one light emitting diode;

wherein the turn signal unit comprises an aperture element disposed between the light source and the lens;

wherein the turn signal unit comprises a film disposed between the lens and the housing so as to be in front of the light source;

wherein the turn signal unit, when the exterior rearview mirror assembly is disposed at a side of an equipped vehicle, and when the light source is powered, emits light in a forward direction of travel of the equipped vehicle;

wherein, with the exterior rearview mirror assembly disposed at the side of the equipped vehicle, light emitted by the light source, when powered, passes through the film and through an aperture of the aperture element and through the lens in the forward direction of travel of the equipped vehicle; and wherein the film comprises structured sections such that light emitted by the light source, when powered, passes through the structured sections of the film and forms an illuminated logo.

2. The exterior rearview mirror assembly of claim 1, wherein the structured sections of the film comprise alternating light transmissive and non-light transmissive structures.

3. The exterior rearview mirror assembly of claim 1, wherein light emitted by the light source, when powered, passes through a light conductor.

4. The exterior rearview mirror assembly of claim 1, wherein the housing comprises a housing floor behind the light source.

5. The exterior rearview mirror assembly of claim 1, comprising at least one shape that secures the film in a non-slip manner.

6. The exterior rearview mirror assembly of claim 5, wherein at least the lens comprises the at least one shape.

7. The exterior rearview mirror assembly of claim 6, wherein the at least one shape comprises a flange of at least the lens.

8. The exterior rearview mirror assembly of claim 5, wherein at least the aperture element comprises the at least one shape.

9. The exterior rearview mirror assembly of claim 8, wherein the at least one shape comprises a flange of at least the aperture element.

10. The exterior rearview mirror assembly of claim 5, wherein at least the housing comprises the at least one shape.

11. The exterior rearview mirror assembly of claim 10, wherein the at least one shape comprises a flange of at least the housing.

12. The exterior rearview mirror assembly of claim 1, wherein the film is sandwiched between the lens and the aperture element.

13. The exterior rearview mirror assembly of claim 1, wherein the film is sandwiched between the lens and the housing.

14. An exterior rearview mirror assembly for a vehicle, wherein the exterior rearview mirror assembly is configured to be disposed at a side of a vehicle, the exterior rearview mirror assembly comprising:

a turn signal unit comprising a housing, a light source and a lens, wherein the lens is disposed in front of the light source, and wherein the lens is attached at the housing;

wherein the light source comprises at least one light emitting diode;

wherein the turn signal unit comprises an aperture element disposed between the light source and the lens;

wherein the turn signal unit comprises a film sandwiched between the lens and the aperture element so as to be in front of the light source;

wherein the turn signal unit, when the exterior rearview mirror assembly is disposed at a side of an equipped vehicle, and when the light source is powered, emits light in a forward direction of travel of the equipped vehicle;

wherein, with the exterior rearview mirror assembly disposed at the side of the equipped vehicle, light emitted by the light source, when powered, passes through the film and through an aperture of the aperture element and through the lens in the forward direction of travel of the equipped vehicle;

wherein the film comprises structured sections such that light emitted by the light source, when powered, passes through the structured sections of the film and forms an illuminated logo; and wherein the structured sections of the film comprise alternating light transmissive and non-light transmissive structures.

15. The exterior rearview mirror assembly of claim 14, wherein light emitted by the light source, when powered, passes through a light conductor.

16. The exterior rearview mirror assembly of claim 14, comprising at least one shape that secures the film in a non-slip manner.

17. The exterior rearview mirror assembly of claim 16, wherein the at least one shape comprises a flange of the lens and a flange of the aperture element, and wherein the film is sandwiched between the flange of the lens and the flange of the aperture element.

18. An exterior rearview mirror assembly for a vehicle, wherein the exterior rearview mirror assembly is configured to be disposed at a side of a vehicle, the exterior rearview mirror assembly comprising:

a turn signal unit comprising a housing, a light source and a lens, wherein the lens is disposed in front of the light source, and wherein the lens is attached at the housing;

wherein the light source comprises at least one light emitting diode;

wherein the turn signal unit comprises an aperture element disposed between the light source and the lens;

wherein the turn signal unit comprises a film sandwiched between the lens and the housing so as to be in front of the light source;

wherein the turn signal unit, when the exterior rearview mirror assembly is disposed at a side of an equipped vehicle, and when the light source is powered, emits light in a forward direction of travel of the equipped vehicle;

wherein, with the exterior rearview mirror assembly disposed at the side of the equipped vehicle, light emitted by the light source, when powered, passes through the film and through an aperture of the aperture element and through the lens in the forward direction of travel of the equipped vehicle;

wherein the film comprises structured sections such that light emitted by the light source, when powered, passes through the structured sections of the film and forms an illuminated logo; and wherein the structured sections of the film comprise alternating light transmissive and non-light transmissive structures.

19. The exterior rearview mirror assembly of claim 18, comprising at least one shape that secures the film in a non-slip manner.

20. The exterior rearview mirror assembly of claim 19, wherein the at least one shape comprises a flange of the lens and a flange of the housing, and wherein the film is sandwiched between the flange of the lens and the flange of the housing.

* * * * *